United States Patent
Arikawa et al.

(10) Patent No.: US 6,201,770 B1
(45) Date of Patent: Mar. 13, 2001

(54) ELECTRONIC TIMEPIECE

(75) Inventors: Yasuo Arikawa, Chino; Eiichi Miyazawa, Suwa, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/111,740

(22) Filed: Jul. 8, 1998

(30) Foreign Application Priority Data

Jul. 9, 1997 (JP) .................................................... 9-184123
Jun. 1, 1998 (JP) .................................................. 10-151429

(51) Int. Cl.[7] .......................... G02F 1/1335; G04C 17/00; G04C 19/00
(52) U.S. Cl. ............................. 368/84; 368/242; 349/96; 349/97
(58) Field of Search ...................... 368/82–84, 239–242; 349/61, 64, 68, 69, 80, 96, 97, 106–108

(56) References Cited

U.S. PATENT DOCUMENTS 5,686,979 * 11/1997 Weber et al. ............................ 349/96

FOREIGN PATENT DOCUMENTS

| 27 23 484 | 11/1997 | (DE) . |
|---|---|---|
| 0 733 928 | 9/1996 | (EP) . |
| WO 95 17692 | 5/1995 | (WO) . |
| WO 95/17303 | 6/1995 | (WO) . |
| WO 95/17691 | 6/1995 | (WO) . |
| WO 95/17699 | 6/1995 | (WO) . |
| WO 95/27919 | 10/1995 | (WO) . |
| WO 96/19347 | 6/1996 | (WO) . |
| WO 97/01439 | 1/1997 | (WO) . |
| WO 97/01440 | 1/1997 | (WO) . |
| WO 97/01610 | 1/1997 | (WO) . |
| WO 97/01726 | 1/1997 | (WO) . |
| WO 97/01774 | 1/1997 | (WO) . |
| WO 97/01778 | 1/1997 | (WO) . |
| WO 97/01780 | 1/1997 | (WO) . |
| WO 97/01781 | 1/1997 | (WO) . |
| WO 97/01788 | 1/1997 | (WO) . |
| WO 97/01789 | 1/1997 | (WO) . |
| WO 97/07653 | 2/1997 | (WO) . |

OTHER PUBLICATIONS

Cholesteric Reflectors With A Color Pattern, R. Mauer et al., SID International Symposium Digest of Technical Papers, US, Santa Ana, SID, vol. 25, 1994, pp. 39–402.

Patent Abstracts of Japan vol. 005, No. 017, Jan. 31, 1981, JP 55–145091, Seiko Epson Corporation, Nov. 14, 1980.

* cited by examiner

Primary Examiner—Vit Miska
(74) Attorney, Agent, or Firm—Oliff & Berridge, PLC (57) ABSTRACT

An electronic timepiece provides a bright and easy-to-read display, and a greater variety of display forms of numerical information, or the like, and a greater variety of background colors. The electronic timepiece may include a polarizer, a liquid crystal element, and a polarization separating film. The polarization separating film transmits linearly polarized light polarized in a certain direction and reflects all other linearly polarized light. The internal structure of the polarization separating film may be divided, in a plane, into polarization separating portions which reflect light of different wavelengths. The polarization separating film reflects different colors in correspondence to the polarization separating portions. Using a reflecting-type polarization separating film allows a bright display to be realized, and providing a plurality of polarization separating portions allows a greater variety of display forms to be realized.

18 Claims, 8 Drawing Sheets

ELECTRONIC TIMEPIECE

BACKGROUND OF THE INVENTION

1. Field of Invention

The present invention relates to an electronic timepiece for measuring and displaying time, such as a wristwatch or a stopwatch.

2. Description of Related Art

Figure 10:
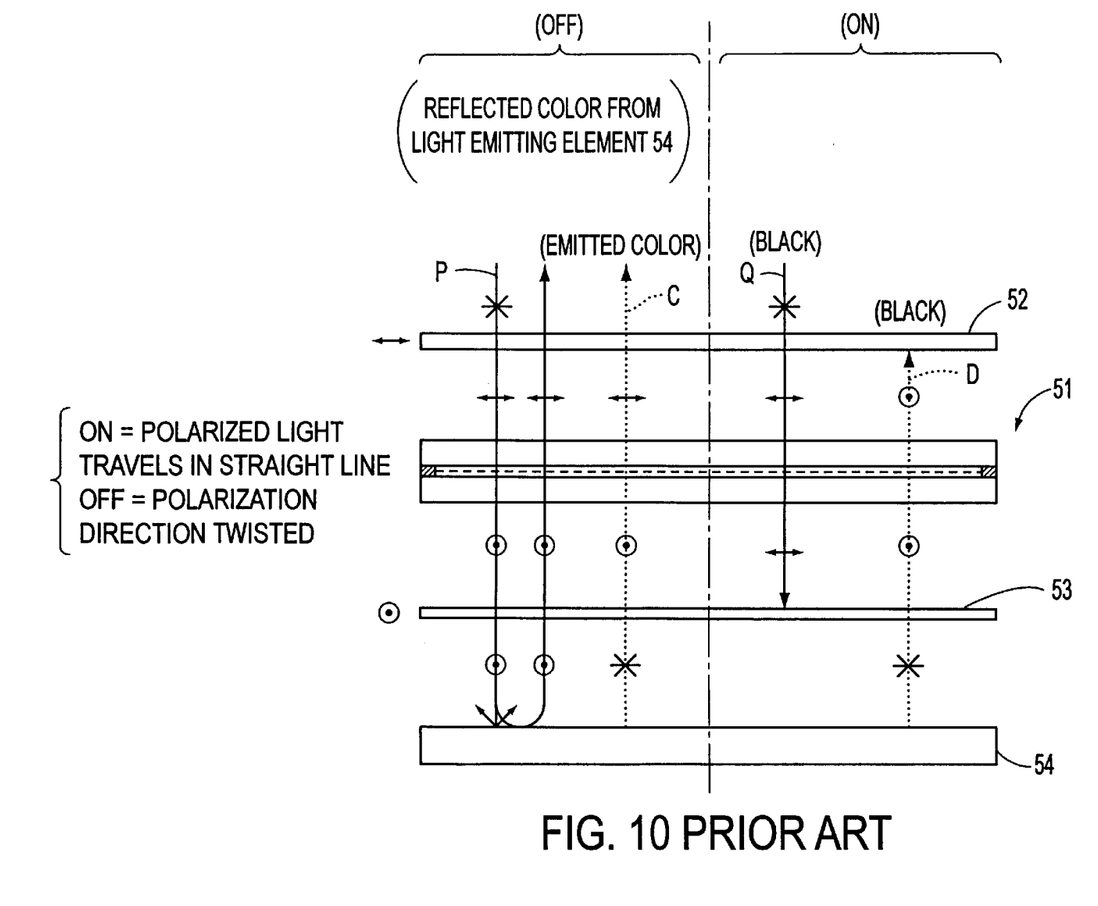
FIG. 10 is a schematic view of the main portion of a conventional electronic, timepiece.

Conventionally, there are widely known electronic timepieces which utilize flat displays, such as liquid crystal displays, for displaying numbers, characters, or other information. For example, as shown in FIG. 10, in an electronic timepiece utilizing a liquid crystal display device, a pair of polarizers 52 and 53 are placed on both sides of a liquid crystal panel 51, and a light-emitting element 54 is disposed at the back side of the polarizer 53. The pair of polarizers 52 and 53 are disposed such that, for example, their azimuthal angles are set to form a right angle.

During daytime, conventional electronic timepieces display numerical information or the like using external light, whereas during the night they display numerical information or the like using light emitted from the light-emitting element 54, when necessary. Numerical information or the like is displayed by applying a predetermined voltage between the electrodes of the liquid crystal panel 51, with the area to which voltage is not applied appearing as a white background or the like. In the figure, the area to which a voltage is applied to display information is represented as ON, whereas the background color area to which a voltage is not applied is represented as OFF.

As indicated by arrow P, when external light is used to produce background color of a display (liquid crystal panel is turned off), the linearly polarized light component of the external light or natural light, which is oriented parallel to the plane of the figure, passes through the polarizer 52. Then, the polarization direction thereof is twisted 90 degrees by the liquid crystal panel 51 in an off state, causing the linearly polarized light to be oriented perpendicular to the plane of the figure. The linearly polarized light, which has passed through the polarizer 53, is irregularly reflected by a surface of the light-emitting element 54, and part of the irregularly reflected light is transmitted successively back through the polarizer 53, the liquid crystal panel 51, and the polarizer 52 to produce a white background which is perceived by any viewer.

As indicated by arrow Q, when numerical information or the like is to be displayed using external light (the liquid crystal panel 51 is turned on), linearly polarized light, which is oriented parallel to the plane of the figure, is separated from the external light by the polarizer 52, and passes through the liquid crystal panel 51. Since the liquid crystal panel 51 is in an on state, the polarization direction of the linearly polarized light is maintained parallel to the plane of the figure, so that it is absorbed by the polarizer 53. The portion that has absorbed the light appears black to any viewer.

As can be understood from the foregoing description, when external light is used, numbers or the like are displayed on a background having a color corresponding to that reflected from the light-emitting element 54 in order to display the time or other information.

On the other hand, as indicated by arrow C, when a background color is to be produced using light emitted from the light-emitting element 54 (the liquid crystal panel 51 is turned off), the linearly polarized light which is oriented perpendicular to the plane of the figure is separated from randomly polarized light emitted from the light-emitting element 54 by the polarizer 53. Since the liquid crystal panel 51 is in an off state, the polarization direction of the linearly polarized light is twisted 90 degrees by the liquid crystal panel 51, causing the linearly polarized light to be oriented parallel to the plane of the figure. Then, the polarized light passes through the polarizer 52 and is perceived by an outside viewer. The perceived color is the color emitted from the light emitting element 54, which is ordinarily white.

As indicated by arrow D, when numerical information or the like is to be displayed using light emitted from the light emitting element 54 (the liquid crystal panel 51 is turned on), the linearly polarized light, which is oriented perpendicular to the plane of the figure, is separated from the light emitted from the light emitting element 54 by the polarizer 53, passes through the liquid crystal panel 51 in an on state, and reaches the polarizer 52. Here, the polarization direction of the linearly polarized light does not match the polarization direction of the polarizer 52, so that the linearly polarized light is absorbed by the polarizer 52. The portion of the polarizer which has absorbed the light, appears black to an outside viewer.

As can be understood from the foregoing description, when light from the light-emitting element 54 is used, numbers or the like are displayed in black or the like on a background having a color corresponding to the color emitted from the light emitting element 54.

In the above-described conventional electronic timepiece, two polarizers 52 and 53 are disposed on both sides of the liquid crystal panel 51. These polarizers are capable of absorbing linearly polarized light other than that having a predetermined polarization direction. Therefore, the intensity of the light, emitted to the outside for producing a background color or displaying numerical information or the like, may be greatly reduced, causing numerical information or the like to appear dark, and thus difficult to read.

In addition, in the above-described conventional electronic timepiece, only one color is reflected by or emitted from the light emitting element 54 within a plane, so that the background color and the displayed information, such as numerical information, have a single tone, which is not capable of sufficiently attracting the attention of any viewer.

SUMMARY OF THE INVENTION

In view of the above-described problems, an object of the present invention is to provide an electronic timepiece which is bright and easy to see. Another object of the present invention is to provide an electronic timepiece which provides a greater variety of display forms of numerical information or the like, and background colors, in order to easily attract the attention of any viewer.

To these end, according to the present invention, there is provided an electronic timepiece that may include (1) a first polarization separator that transmits linearly polarized light polarized in a first direction while not transmitting therethrough light linearly polarized in a direction perpendicular to said one direction;

(2) a polarization changing element disposed at a position to receive the linearly polarized light from the first polarization separator, that selects either one of a state in which a polarization direction of the polarized light being transmitted is changed and a state in which the polarization direction of the polarized light being transmitted is not changed; and (3) a second polarization separator that transmits the linearly polarized light polarized in a second direction and reflects light linearly polarized in a direction perpendicular to said second direction, the second polarization separator disposed opposite the first polarization separator with the polarization changing element interposed therebetween, the second polarization separator has, within a plane, a plurality of polarization separating portions reflecting light of different wavelengths.

In both of the above-described structures, an ordinary polarizer may be used for the first polarization separator. An ordinary polarizer may be composed of a film-like element capable of allowing linearly polarized light, polarized in a certain direction, of the incident natural light to leave the display device. It is formed by, for example, placing a polarization layer in a cellulose triacetate (TAC) protective layer.

A liquid crystal panel, for example, may be used for the aforementioned polarization changing element. Various liquid crystals may be used, including a twisted nematic (TN) liquid crystal, a super-twisted nematic (STN) liquid crystal, and an electrically controlled birefringence (ECB) liquid crystal. STN liquid crystals include, for example, film compensated super-nematic (F-STN) liquid crystals using a color compensating optical anisotropic member.

As the second polarization separator, there may be used, for example: 1) a polarization separating film consisting of a plurality of laminated thin films as disclosed in International Patent Publication Nos. WO95/17692 and WO95/27919; 2) a polarization separating plate in which a $\lambda/4$ phase plate provided at one or both sides of a cholesteric liquid crystal layer; 3) a polarization separator which separates polarized light by reflection and transmission by setting the angle at the Brewster's angle (refer to pp. 427 to 429 in SID 92 DIGEST); or a polarization separator using a hologram.

Features of the electronic timepiece of the present invention having the above-described structure are (A) the use of the second polarization separator, corresponding to the structural element (3), instead of the polarizer disposed at the back side of the polarization changing element in conventional electronic timepieces; and (B) formation of the surface of the second polarization separator which opposes the polarization changing element into a smooth surface which specularly reflects light.

Whereas a commonly-used polarizing plate transmits linearly polarized light polarized in a first direction while not transmitting therethrough light linearly polarized in a direction perpendicular to said one direction by absorbing them or the like, the second polarization separator transmits linearly polarized light polarized in a second direction and reflects light linearly polarized in a direction perpendicular to said second direction, and, in particular, totally reflects linearly polarized light polarized in a direction perpendicular to the polarization direction of the polarized light being transmitted.

Therefore, according to the aforementioned feature (A), when a second polarization separator having the above-described structure is used instead of the commonly used polarizer or the like, the light, which is absorbed or scattered when a polarizer is used in conventional display devices or electronic timepieces, is reflected, so that the background of the electronic timepiece or information, such as numerical information, can be made bright by the reflected light, thereby making the numerical information or the like easier to read in relation to the background color of the display. This is very convenient for people who have weak eyesight, such as old people.

In addition, according to the aforementioned feature (B), when a plurality of polarization separating portions which reflect different wavelengths are disposed at different locations within a plane, and external natural light is reflected by the second polarization separator to produce background color, or display numerical information or the like, the background color is produced and numerical information or the like is displayed in different colors based on the wavelength characteristics of the individual polarization separating portions. As a result, it is possible to produce a novel display that strongly attracts the attention of any viewer.

A description will now be given of various embodiments of the electronic timepiece having the above-described structure.

A light scattering layer may be provided opposite the first polarization separator with the polarization changing element interposed therebetween. For example, in the electronic timepiece of the present invention, external natural light, received by the first polarization separator, passes through the polarization changing element, and leaves the electronic timepiece after being reflected by the second polarization separator (as indicated by arrow P of FIG. 1). In this case, when there is nothing disposed in the optical path, the light is specularly reflected out of the electronic timepiece, and the specularly reflected light is perceived by the viewer as background color. On the other hand, when the light scattering layer is disposed in the optical path, the viewer perceives a white color or other appropriate colors instead of a specularly reflected color. The designer or the like is free to choose between a structure that allows specular reflection and a structure that allows an appropriate color to be produced.

In addition to the aforementioned structural elements, a light-emitting element that emits light to the polarization changing element through the second polarization separator may be provided. The light-emitting element which may be used includes: 1) a planar light-emitting element like an electroluminescence (EL) element; 2) a light-emitting device in which a cold cathode, being a linear light source, is disposed at a side end face of a light guide plate having a planar light-emitting surface; and 3) a light emitting device or the like in which a plurality of light emitting diodes (LEDs), being point-like light sources, are disposed in a row at a side end face of a light guide plate having a planar light emitting surface.

When a light-emitting element is used as an additional structural element as in the present embodiment, the viewer can freely select a display method, that is the display method using external natural light or that using a light-emitting element. In addition, when, as in the present invention, the second polarization separator, that transmits linearly polarized light polarized in a certain direction and reflects linearly polarized light parallel thereto, is used instead of an ordinary polarizer, numerical information or the like can be displayed in various forms, and various background colors can be produced, compared to conventional electronic timepieces in which two polarizers are used for displaying information or producing a background color.

For example, in conventional devices, when the display method is switched between that using external natural light and that using the light emitting element, there is not much difference between the background colors and the forms of display of such information as numerical information. For example, when numerical information or the like is displayed in a dark color, such as black, on a background with a color corresponding to the reflected color or the emitted color of the light emitting element, and the display method is switched, only the way in which the background color is produced by the light emitting element is changed, so that the background color is either produced by the reflected color or the emitted color of the light emitting element, ordinarily causing the background color to be the same in both cases. Similarly, when numerical information or the like is displayed in a color corresponding to the reflected color or emitted color of the light emitting element on a background with a dark color, such as black, only the way in which the color of the numerical information or the like is produced by the light emitting element is changed, so that the color of the numerical information or the like is produced either by the reflected color or the emitted color of the light emitting element.

Compared to the above-described conventional devices, the electronic timepiece of the present invention including a light emitting element is constructed in such a way as to allow the background color and the form of display of the numerical information or the like to be changed drastically, when the display method switches between that using external natural light and that using the light emitting element. This change may surprise the viewer.

For example, when the display method is switched from that using external natural light to that using the light-emitting element, the ordinary display form, numerical information or the like is displayed in a dark color, such as black, on a bright background color, and is switched from the display form in which numerical information or the like is displayed in a color characteristic of the light emitting element on a dark background, such as a black background. This change in display form is effective in surprising the viewer, and is also, in practice, effective in the following ways.

For example, when a digital wristwatch is used as an electronic timepiece, and the wristwatch is made visible, during the night when it is dark out, by light emitted from the light emitting element, it is possible to display numerical information or the like in a color, such as red, which can be easily distinguished from black on a black background color. In addition, when a divers watch for use in the water is used as an electronic timepiece in order to give a warning to the diver as regards water pressure and diving time, a color, such as yellow, which stands out can be used to give a warning.

When a light emitting element is used as a structural element, a translucent layer may be provided between the second polarization separator and the light emitting element thereof. For example, in the electronic timepiece of the present invention, natural light, received by the first polarization separator, passes through the polarization changing element and the second polarization separator and arrives at the surface of the light emitting element, with the light ordinarily being irregularly reflected by the surface of the light emitting element. The color in which numerical information or the like is displayed depends on the color produced at the portion where light is irregularly reflected. A portion of the light irregularly reflected from the portion where the information is displayed leaves it, so that the contrast of this portion is reduced by a corresponding amount with respect to the background color, making the displayed numerical information or the like difficult to read.

When a translucent layer is provided between the second polarization separator and the light emitting element, as mentioned above, the light is absorbed by the translucent layer, so that the luminance of the information to be displayed is sufficiently reduced, as a result of which the displayed numerical information or the like has high contrast.

It is desirable to construct the light emitting element so that it emits at least one of the following colors: orange, red, or yellowish green, although other colors may be used. In the electronic timepiece of the present invention, numerical information or the like may be displayed in the color emitted by the light emitting element. Since the aforementioned colors stand out against black, when the light emitting element is made to emit any one of the aforementioned colors to display numerical information or the like in any one of these colors, the displayed information becomes bright and easy to read, thereby easily attracting the human eye.

In the foregoing description, nothing was particularly stated about whether the light emitting element is to emit a single color or a plurality of colors. When the light emitting element is constructed to emit a plurality of colors, numerical information or the like can be displayed in several colors in one electronic timepiece, so that displays of a greater variety of colors can be realized.

When the aforementioned light emitting element is used to emit a plurality of colors, the color emitted by the light emitting source itself may be changed, and the light emitting element may be composed of a white light emitting source and a color filter.

As mentioned above, various polarization separating elements can be used for the second polarization separator, but it is desirable that a polarization separating film, disclosed in International Patent Publication Nos. WO95/17692 or WO95/27919, be used for the second polarization separator.

According to the present invention, there may be provided an electronic timepiece including: a polarizer, a twisted nematic (TN) liquid crystal layer interposed between two substrates and a polarization separating film. The polarizer, the twisted nematic liquid crystal layer, and the polarization separating film may be laminated in that order to form the electronic timepiece. The polarization separating film may transmit polarized light polarized in a first direction and reflect polarized light polarized in a direction perpendicular to the first direction, the polarized light separating film including at least a first area and a second area. The liquid crystal layer may include at an upper portion thereof a first display area in correspondence with the first area and a second display area in correspondence with the second area.

By virtue of this construction, when the display areas of the electronic timepiece are assigned different functions, such as a calendar function, a clock function, or a graph function, the color of each of the display portions can be changed and be different from each other, making the electronic timepiece very easy to see.

DETAILED DESCRIPTION OF PREFERRED EMBODIMENTS

Figure 4:
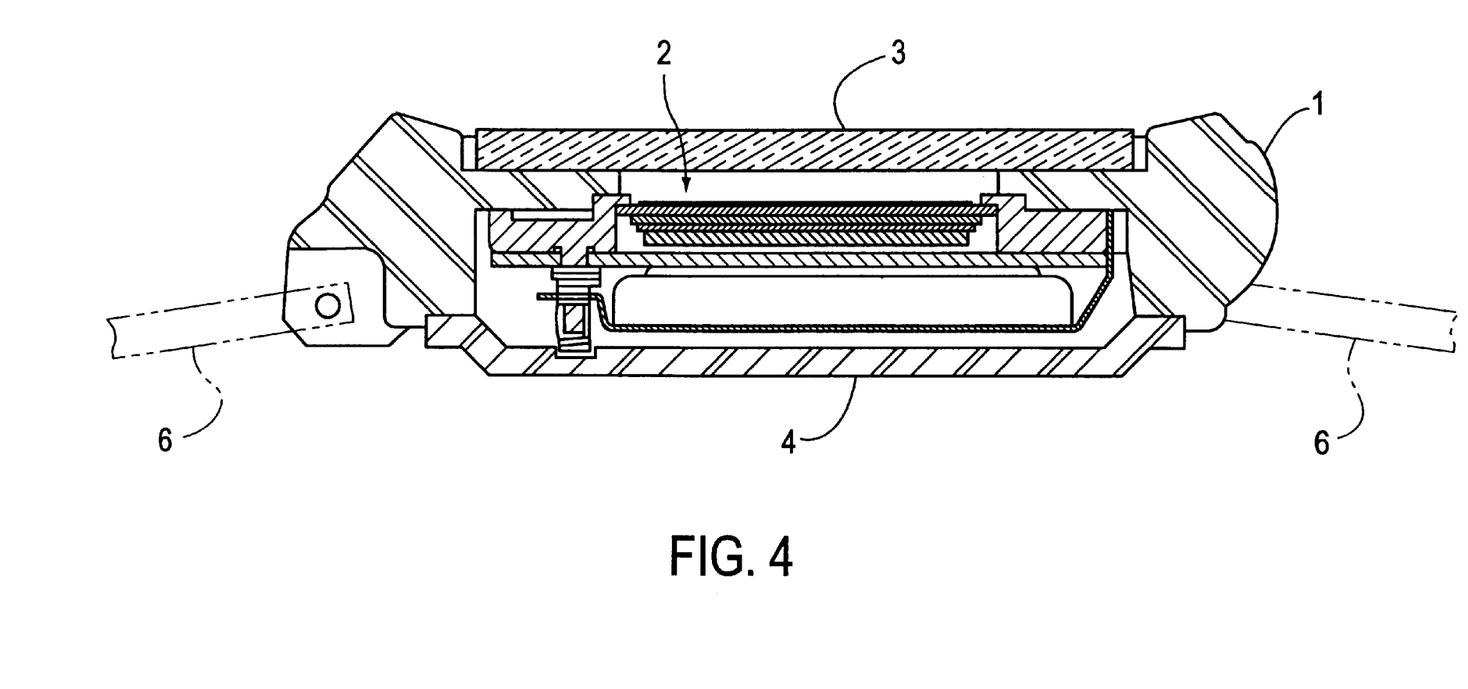
FIG. 4 is a sectional view of the structure of an electronic wristwatch used as an embodiment of the electronic timepiece in accordance with the present invention.

FIG. 4 is a sectional view of the structure of an embodiment of an electronic wristwatch used to describe the electronic timepiece in accordance with the present invention. The wristwatch comprises, for example, a plastic case 1, an assembly 2 contained in the case 1, a glass cover 3 affixed to the case 1 and disposed above the assembly 2, and a back cover 4 affixed to the assembly 2. Reference numeral 6 denotes a wristband.

Figure 6:
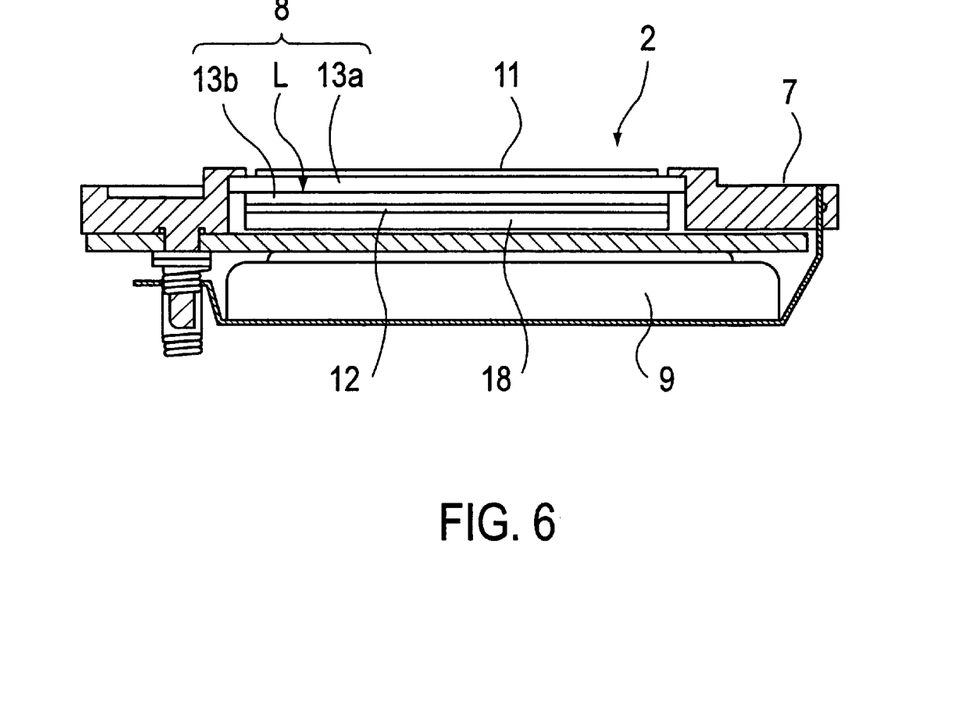
FIG. 6 is a sectional view of the movement of FIG. 5.

As shown in FIG. 6, the assembly 2 includes a panel frame 7; a liquid crystal element 8, serving as a polarization changing element, supported by the panel frame 7; a polarizer 11, serving as a first polarization separator, affixed to the outside surface (upper surface in the figure) of the liquid crystal element 8; a polarization separating film 12, serving as a second polarization separator, disposed opposite the polarizer 11 with the liquid crystal element 8 interposed therebetween; a backlight 18, serving as a light-emitting element, disposed at the bottom surface side of the polarization separating film 12; and a battery 9.

Figure 2:
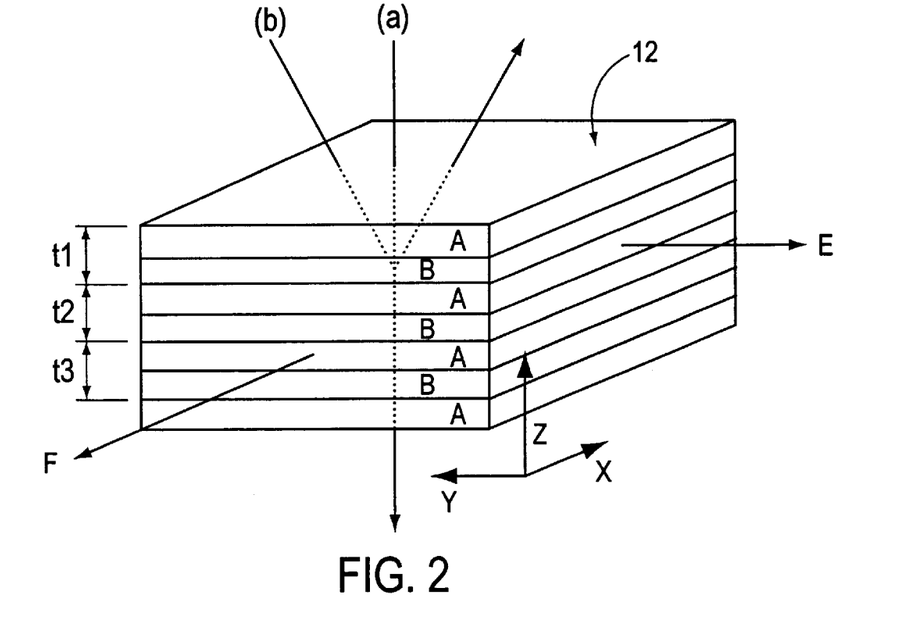
FIG. 2 is a perspective view schematically showing the internal structure of the polarization separating film used as the main portion in the structure of FIG. 1.

The polarizer 11 is an ordinary polarizer that transmits only linearly polarized light polarized in a certain direction, while not transmitting other linearly polarized light by absorption, scattering, or the like. As shown in FIG. 2, the polarization separating film 12 is a laminated structure of a plurality of thin films. As mentioned above, the polarization separating film 12 transmits only linearly polarized light polarized in a certain direction, and does not transmit all other types of linearly polarized light, not by absorption or the like, but by reflection. The polarization separating film 12 transmits, in particular, linearly polarized light polarized in a first direction and totally reflects linearly polarized light polarized in a direction perpendicular to the first direction.

For example, a polarization separating film, shown in FIG. 2, may be used, which has a multi-layered structure formed by alternately laminating two types of layers A and B. Any two adjacent layers A and B have the same refractive index in a certain direction, but different refractive indices in a direction perpendicular to the certain direction, and each of the individual layers have different thicknesses.

In FIG. 2, three axial directions X, Y, and Z, which are perpendicular to each other, are defined. A multi-layered structure is formed by subjecting layers A and B to, for example, extrusion molding, and stretching them in a certain direction (such as direction X), but not in direction Y, when the stretching direction is in direction X. In other words, the X-axis direction corresponds to the stretching direction, whereas the Y-axis direction is oriented transversally with respect to the stretching direction. Material B has a refractive index $n_B$ (such as 1.64), which essentially does not change when stretching is performed. On the other hand, the refractive index of material A changes when stretching is performed. For example, uniaxially stretching a sheet made of material A causes it to have a refractive index $n_{AX}$ (such as 1.88) in the stretching direction (that is direction X) and a different refractive index $n_{AY}$ (such as 1.64) in a transverse direction with respect to the stretching direction (that is, direction Y). Stretching the layered structure of FIG. 2 formed of materials A and B in the direction X causes it to have a refractive index difference of $\Delta n=1.88-1.64=0.24$ in the stretching direction. On the other hand, there is no difference between the refractive indices of the A and B layers in the direction Y perpendicular to the stretching direction, since $\Delta n=1.64-1.64=0$. Since the layered structure has the aforementioned optical property, when light impinges upon the polarization separating film 12, the polarized light (a) of the incident light which is oriented in the direction of polarization axis E passes through the polarization separating film 12. On the other hand, the polarized light (b) of the incident light which is oriented in the direction of absorption axis F directly strikes a surface having a refractive index difference $\Delta n$, so that it is reflected at the surface.

Figure 3:
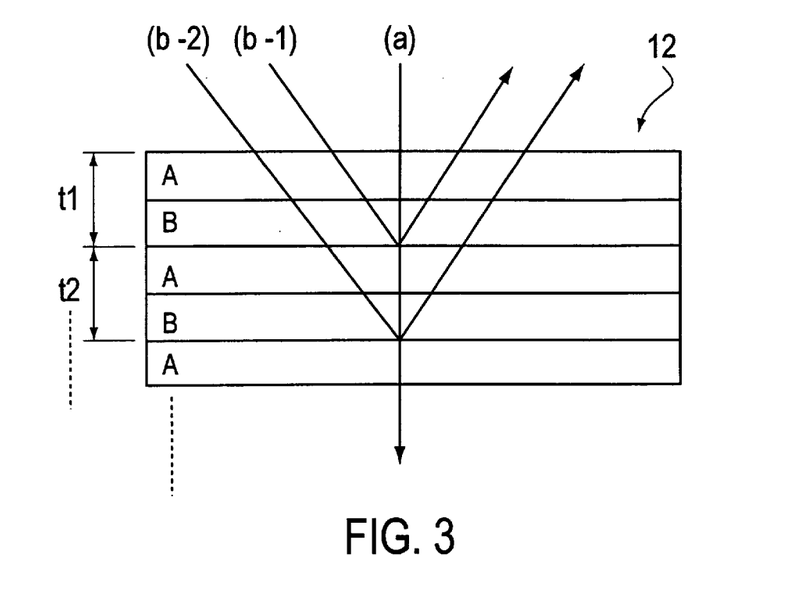
FIG. 3 is a schematic view illustrating the operation of the polarization separating film of FIG. 2.

In addition, thicknesses t1, t2, t3, . . . , of each of the layers A and B differ slightly, so that, as shown in FIG. 3, light beams of different wavelengths, (b-1), (b-2), . . . , can be reflected at the boundary surfaces between layers A and B. In other words, a multi-layered structure consisting of layers A and B with different thicknesses allows light consisting of various wavelengths to be efficiently reflected.

When the thicknesses, t1, t2, t3, . . . , of each of the layers are combined in such a way as to reflect all light wavelengths, the final color of the reflected light is white. When suitable combinations of the thicknesses, t1, t2, t3, . . . , of each of the layers are used, the polarization separating film 12 can be made to selectively reflect only the desired wavelength or color. When a plurality of types of polarization separating films, each of which has thickness combinations that differ from one another, are disposed at different locations within a plane, and are irradiated by natural light, different colors can be reflected from each of the polarization separating films. This allows the electronic timepiece to provide an even greater variety of display forms.

Figure 1:
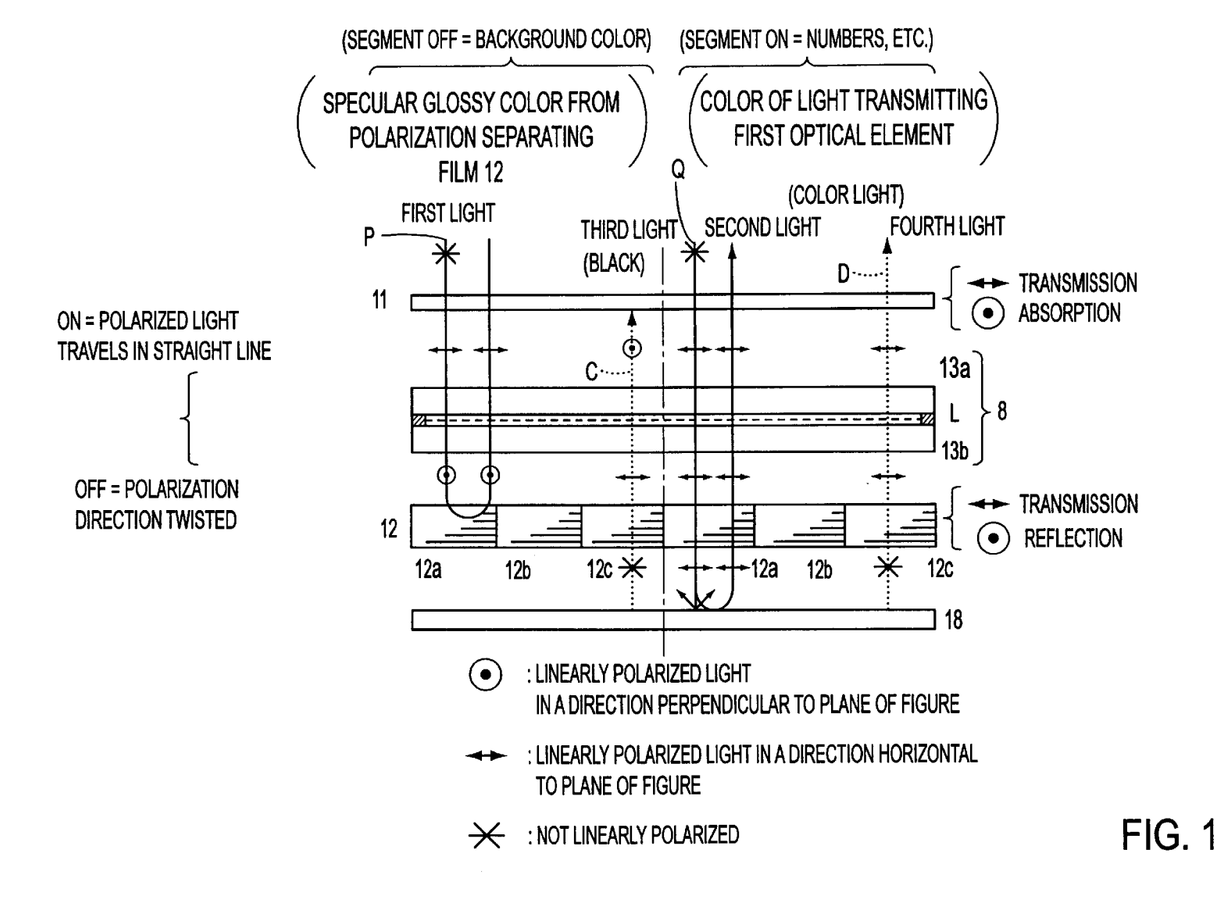
FIG. 1 is a schematic view of the main portion of an embodiment of an electronic timepiece in accordance with the present invention.
Figure 7:
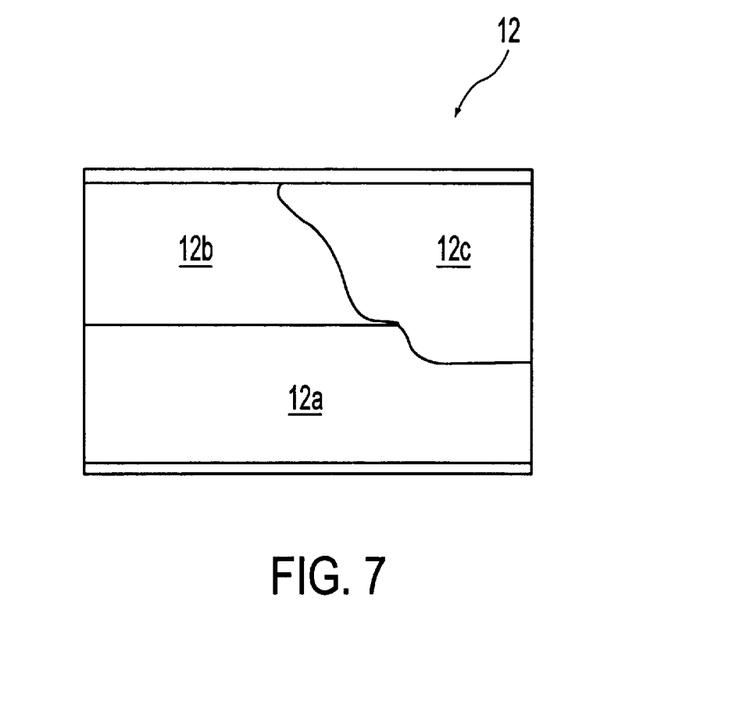
FIG. 7 is a plan view of the polarization separating film.

As shown in FIGS. 1 and 7, each portion of the polarization separating film 12 of the present embodiment includes three polarization separating portions 12a, 12b, and 12c. Each polarization separating portion has a laminated structure of thin films, as shown in FIG. 2, with thicknesses, t1, t2, t3, . . . , of the layers of their respective thin film laminated structures being different among the polarization separating portions 12a, 12b, and 12c. As a result, each of the polarization separating portions 12a, 12b, and 12c reflect light of different wavelengths. In other words, when a linearly polarized light polarized in a particular direction impinges upon the polarization separating film 12, different colors are obtained from each of the polarization separating portions 12a, 12b, and 12c. Various methods can be used to dispose the plurality of polarization separating portions 12a, 12b, and 12c within a plane, such as properly arranging them in a row on a base film and affixing them thereto using an adhesive or the like.

The backlight 18 of FIG. 6 is composed of, for example, an electroluminescence (EL) element which is a planar light-emitting element. One surface of the backlight 18 may be formed with a light-scattering surface for scattering light, and, in the present embodiment, produces a gray appearance.

The liquid crystal element 8 comprises a pair of opposing transparent glass substrates 13a and 13b, with a so-called cell gap formed therebetween. Liquid crystal, such as a twisted nematic (TN) liquid crystal L, is filled in the cell gap.

Figure 5:
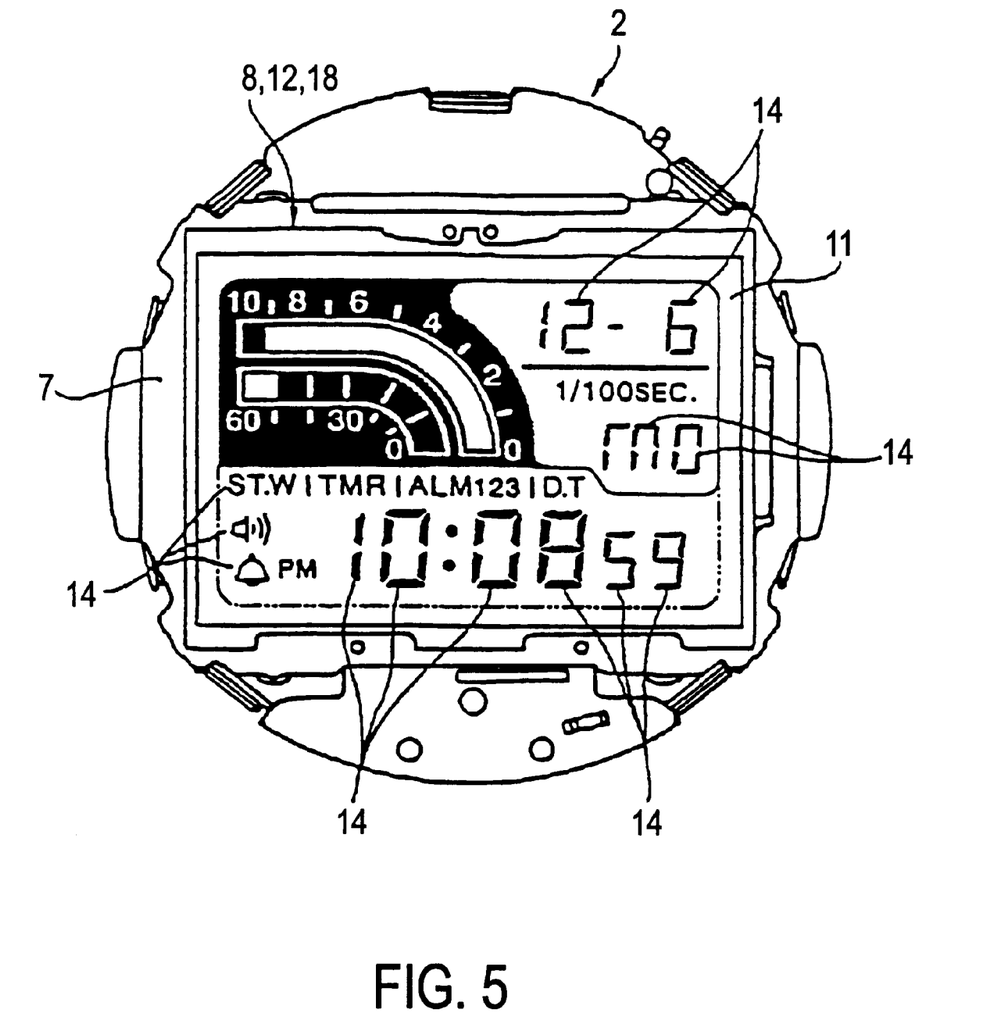
FIG. 5 is a plan view of the movement used in the electronic wristwatch of FIG. 4.

As shown in FIG. 5, a plurality of transparent electrodes 14 are formed on each of the glass substrates 13a and 13b in order to display, for example, numbers or characters. In the present embodiment, each of the transparent electrodes is divided into seven segments used for displaying one digit.

A predetermined voltage can be applied between the opposing pairs of transparent electrodes 14 formed on the pair of glass substrates 13a and 13b. The liquid crystal L is set in either of two alignment states depending on whether a voltage is applied (ON) or not applied (OFF). In the present embodiment, when the liquid crystal is set in an on state, the polarization direction of the linearly polarized light is not changed, whereas when the liquid crystal is set in an off state, the polarization direction of the linearly polarized light is twisted 90 degrees.

A description will now be given of the operation of the electronic wristwatch having the above-described structure. The wristwatch has two types of light sources, backlight 18 and external natural light. When background color of the wristwatch is to be produced, the area of the liquid crystal element 8 corresponding to the background is turned off, whereas when numerical information or the like is to be displayed, the area of the liquid crystal element 8 corresponding to where the numerical information is to be displayed is turned on. The uses of external natural light and backlight are separately described below.

When outside natural light is used, particularly for producing background color, the liquid crystal element 8 of FIG. 1 is set in an off state. Then, as indicated by arrow P in the same figure, the linearly polarized light of the external light or natural light oriented in a direction parallel to the plane of the figure passes through the polarizer 11, and its polarization direction is twisted 90 degrees by the liquid crystal element 8 set in an off state, causing the linearly polarized light to be polarized in a direction perpendicular to the plane of the figure. The linearly polarized light is reflected by the layer surfaces in the polarization separating film 12 in accordance with its wavelength. The reflected light component pass successively back through the liquid crystal element 8 and the polarizer 11 for producing the background color which is perceived by the viewer.

In the present embodiment, as shown in FIG. 7, the polarization separating film 12 may be divided into polarization separating portions 12a, 12b, and 12c, each of which reflects light of a different color. Therefore, the display surface of the electronic timepiece has a multi-colored background obtained from the plurality of portions. A greater variety of display forms can be provided for the viewer compared to the case where either one of the ordinarily used colors, white or gray, is used singly.

When external natural light is to be used to display numerical information or the like, the liquid crystal element 8 is set in an on state. Then, as indicated by arrow Q, the linearly polarized light which is parallel to the plane of the figure is separated from the external light by the polarizer 11, and passes through the liquid crystal element 8. Here, the liquid crystal element 8 is in an on state, so that the polarization direction of the linearly polarized light stays parallel to the plane of the figure. Therefore, the linearly polarized light passes through the polarization separating film 12, and is irregularly reflected by the surface of the backlight 18. Seen from the outside, this portion has a dark color, such as gray, so that numerical information or the like is displayed in a dark color or in gray, which is perceived by the viewer.

As can be understood from the foregoing description, when external natural light is used, numerical information or the like can be displayed in a dark color on a background having different colors produced in correspondence with the positions of the polarization separating portions 12a, 12b, and 12c of the polarization separating film 12.

When backlight 18 is used for producing, in particular, background color, the backlight 18 is turned on, and the liquid crystal element 8 is set in an off state. Then, as indicated by arrow C, the linearly polarized light polarized parallel to the plane of the figure is separated from the light or randomly polarized light emitted from the backlight 18 by the polarization separating film 12. Thereafter, the polarization direction of the linearly polarized light is twisted 90 degrees by the liquid crystal display element 8 set in an off state, causing the linearly polarized light to be polarized in a direction perpendicular to the plane of the figure. The linearly polarized light, which is either absorbed or scattered by the polarizer 11, is prevented from travelling out of the display device, so that from the outside the background appears black.

When backlight 18 is to be used to display numerical information or the like, the backlight 18 is turned on and the liquid crystal element 8 is set in an on state. Then, as indicated by arrow D, the linearly polarized light polarized parallel to the plane of the figure is separated from the light of the backlight 18 by the polarization separating film 12. The linearly polarized light passes through the liquid crystal element 8 in an on state, and then through the polarizer 11, whereby numerical information or the like is displayed.

As can be understood from the foregoing description, when, for example, the light emitted from the backlight 18 is used, numerical information, such as time or the like, is displayed on a black background. For example, when the backlight 18 is made to emit a red color, the information is displayed in red on a black background. Information on such displays is much easier to read than in conventional displays in which, at night, information is displayed in black on a white background.

In addition, such displays are suitable for use in, for example, a divers watch for giving a warning to the diver. More specifically, when it becomes necessary to give a warning to the diver as regards the water pressure or the diving time, the backlight 18 can be made to emit a color that easily attracts the human eye, such as yellow, to produce a yellow color on a black background, with such a display form being effective in warning the diver.

The backlight 18 may be made to emit light of various colors in accordance with the demands of the viewer. When the backlight 18 is made to emit orange light, red light, or yellowish green light, the displayed information can be easily read, since these colors can be easily distinguished from a black background.

The display form of an electronic timepiece using external light greatly differs from the display form of an electronic timepiece using backlight 18, so that the electronic timepiece easily attracts the attention of the viewer, making the two forms of display extremely advantageous.

The backlight 18 may be made to emit a single color from the entire surface thereof, or be made to emit as a whole multiple colors from several divided sections thereof each emitting a different color. When numerical information or the like is to be displayed using the backlight 18 set to emit multiple colors, various information can be displayed in different colors, so that multiple forms of display that meet various demands can be realized.

In the conventional device of FIG. 10, when background color is to be produced using external light, the external light passes through the polarizer 53 twice, as indicated by arrow P. When the external light passes through the polarizer 53, the intensity of the white color of the background may be reduced, which may darken the display of the wristwatch. In the wristwatch of the present embodiment, however, as indicated by arrow P of FIG. 1, external natural light is reflected by the polarization separating film 12, and the reflected external light is used to produce the background color. Therefore, less light is absorbed by the polarizer, so that the background becomes bright. This makes it possible to provide a display which allows people who have weak eyesight, such as old people, to easily read the displayed information.

Figure 8:
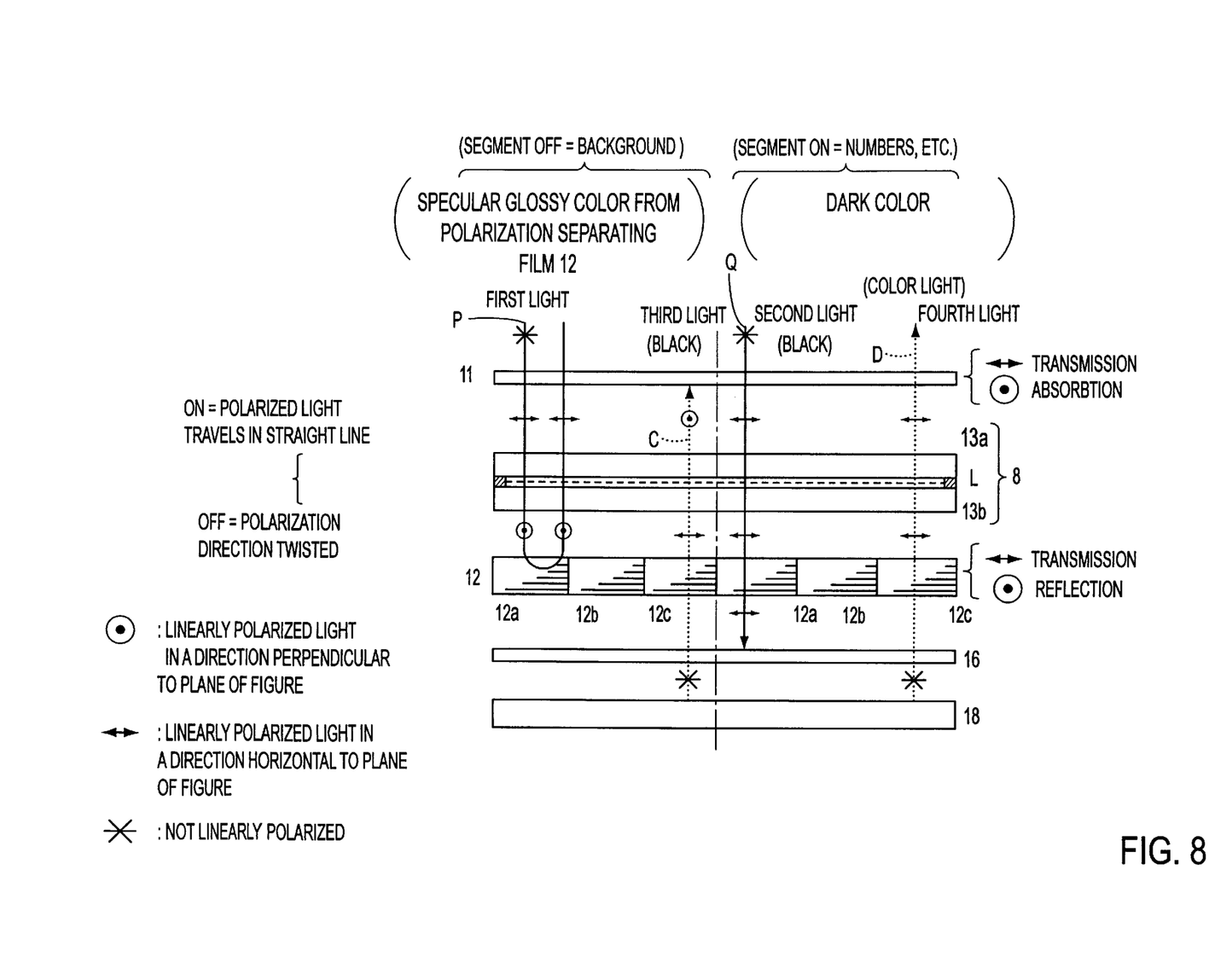
FIG. 8 is a schematic view of the main portion of another embodiment of an electronic timepiece in accordance with the present invention.

FIG. 8 is a view showing the main portion of still another embodiment of an electronic timepiece in accordance with the present invention. The present embodiment differs from the previously described embodiment of FIG. 1 in that a translucent layer 16 is disposed between the polarization separating film 12 and the backlight 18. The translucent layer 16 is formed of, for example, a gray light-absorbing material in a translucent state or a black light-absorbing material, and has a plurality of holes for transmitting light.

In the present embodiment, as indicated by arrow Q, when the liquid crystal panel is set in an on state in order to display numerical information or the like using external natural light, the linearly polarized light leaving the polarization separating film 12 is either absorbed or scattered by the translucent layer 16, so that the portion where absorption or scattering occurs has a vivid black color. In this case, compared to the case where numerical information or the like is displayed in a dark color, such as gray, as a result of irregularly reflecting light from one surface of the backlight 18, as indicated by the arrow Q of FIG. 1, the numerical information or the like can be displayed with high contrast.

Figure 9:
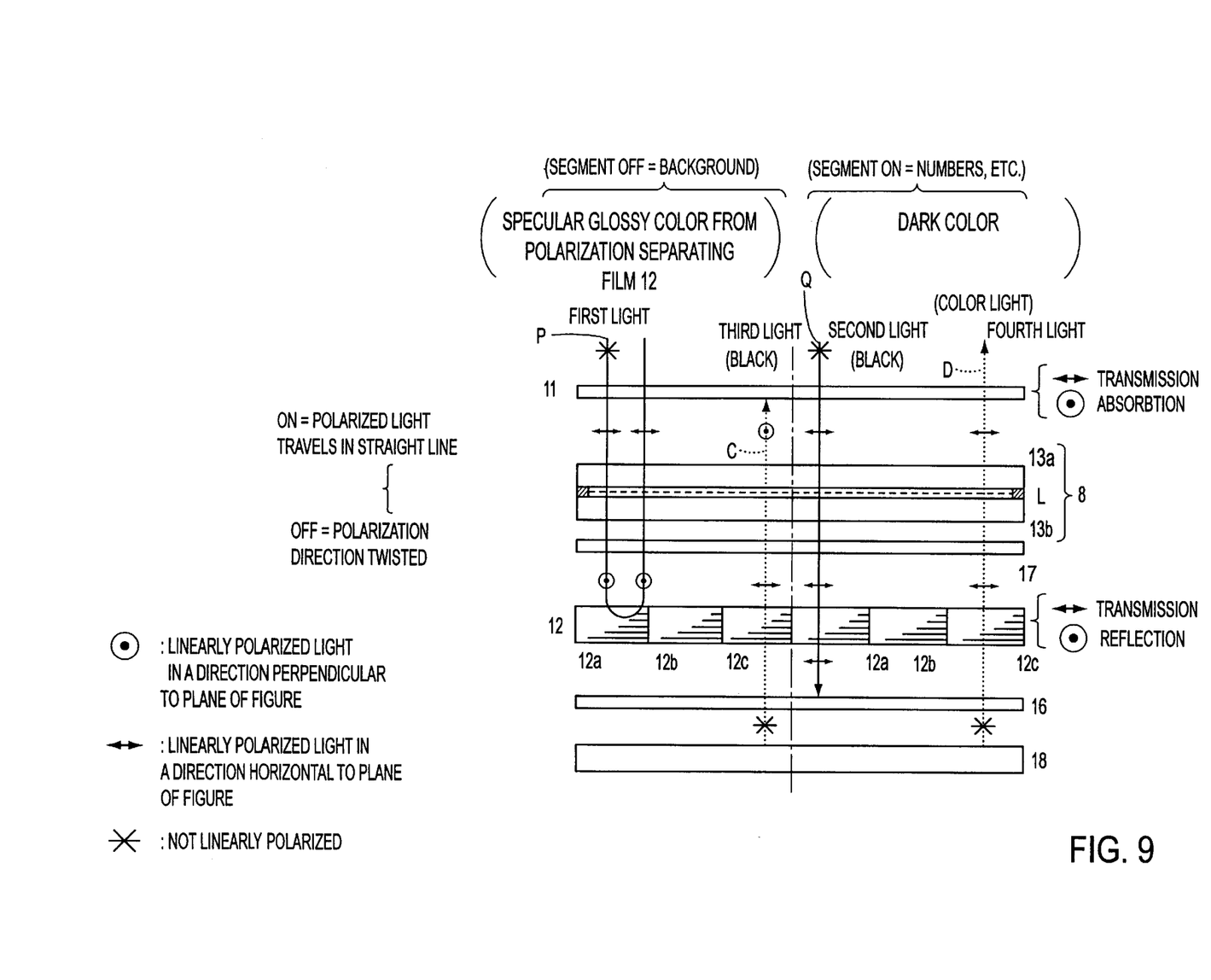
FIG. 9 is a schematic view of the main portion of still another embodiment of an electronic timepiece in accordance with the present invention.

FIG. 9 is a view showing the main portion of still another embodiment of an electronic timepiece in accordance with the present invention. The present embodiment differs from the embodiment of FIG. 1 in that a translucent layer 16 is disposed between the polarization separating film 12 and the backlight 18, and that a light scattering layer 17 is disposed between the liquid crystal panel 8 and the polarization separating film 12. In the present embodiment, various background colors can be obtained by scattering light from the light scattering layer 17, instead of by specular reflection.

Although the present invention was described with reference to the preferred embodiments thereof, the present invention is not limited thereto, so that various modifications can be made. For example, in the present embodiments, the invention was described using a wristwatch. The present invention may be applied to any other electronic timepiece having a different structure, such as a stopwatch. A light-emitting element other than an EL element may be used.

Although in the present embodiments a TN liquid crystal panel was used as the polarization changing element for selecting either a state in which the polarization direction of the polarized light being transmitted is changed or a state in which the polarization direction of the polarized light being transmitted is not changed, an STN liquid crystal panel or an ECB liquid crystal panel may also be used.

In addition, although a multi-layered structure consisting of a plurality of laminated thin films, such as that shown in FIG. 2, was used as the second polarization separator which transmits linearly polarized light polarized in a certain direction and reflects linearly polarized light polarized perpendicular thereto, there may also be used, for example: 1) a polarization separating plate in which a $\lambda/4$ phase plate is provided at one or both sides of a cholesteric liquid crystal layer; 2) a polarization separator which separates polarized light by reflection and transmission by setting the angle at the Brewster's angle (refer to pp. 427 to 429 of SID 92 DIGEST); and 3) a polarization separating element utilizing a hologram.

Although in the present embodiment the polarization direction of the polarizer 11 and the polarization direction of the polarization separating film 12 have been described as being parallel to each other, the polarization direction of the polarizer 11 and the polarization direction of the polarization separating film 12 can be set perpendicular to each other. In such a case, when outside natural light is used to set the segments in the off state or the on state, the color of the segments in the off state and the color of the segments in the on state are opposite to those in an electronic timepiece where the polarization direction of the polarizer 11 and the polarization direction of the polarization separating film 12 are parallel to each other. The same is true when the backlight is used, instead of outside natural light.

A description will be given of the relationship between the electronic timepiece of FIG. 5 and the polarization separating film of FIG. 7. The division lines on the polarization separating film of FIG. 7 correspond to the division lines on the electronic timepiece of FIG. 5. An embodiment in which outside natural light is used to change the color reflected from each of the divided portions of the polarization separating film will be described below.

Reference numeral 12a of FIG. 7 denotes an area corresponding to the current time display area (displaying 10:08'59) of FIG. 5. It is desirable that the background color (corresponding to the color of the portion not having segments) be white. In the electronic timepiece of FIG. 5, this area becomes the main display area, so that a basic color is used for this area.

Reference numeral 12b of FIG. 7 denotes an area corresponding to the upper left graph display area of FIG. 5. The graph extending portion includes segments. It is desirable that the area not including segments be red although other colors may also be used. The graph boundaries and the numbers are printed in black on a glass held by the TN liquid crystal layer, so that they are always indicated on the timepiece.

Reference numeral 12c of FIG. 7 denotes an area corresponding the upper right calendar display area of FIG. 5. It is desirable that the background color be blue although other colors may be used. Like the graph boundaries and the numbers in the section 12b of FIG. 7, $\frac{1}{100}$ SEC or the like is printed.

As shown in FIG. 7, the polarization separating film is divided into three areas 12a, 12b and 12c, so that the background color can be changed in accordance with the functions (the time function, the graph function, and the calendar function), thus making it easier to distinguish between the display portions. As a result, an electronic timepiece which can easily be seen can be provided.

According to the electronic timepiece, a background color may be produced and numerical information or the like may be displayed by light reflected from the second polarization separator, so that unlike the conventional case where background color or the like is produced by light transmitted through a polarizer, the problem of reduced luminance due to absorption of light by the polarizer does not exist, so that a bright and vivid display is provided. In addition, the second polarization separator may include a plurality of polarization separating portions with different wavelength characteristics, so that the background and displayed numerical information or the like can be made to have differently colored portions, thereby allowing the electronic timepiece to provide a still greater variety of display forms.

According to the electronic timepiece, light scattered from the light scattering layer may be used, so that a white background or a background having any other color can be produced without making use of specular reflection.

According to the electronic timepiece, when a second polarization separator that reflects, rather than absorbs, linearly polarized light other than a particular linearly polarized light, and a light emitting element are used in combination, and the method of display is switched from that using external natural light to that using a light emitting element, the background color and the display form of information can be changed considerably, with such a change surprising the viewer.

According to the electronic timepiece, when external light is used to display numerical information or the like, a translucent layer may be used that absorbs light, causing the information to be displayed in black, so that a high contrast with respect to the background color can be realized.

According to the electronic timepiece, when orange, red, or yellowish green, or other colors, which can be easily distinguished from a black background, is used to display numerical information or the like, the displayed information can be very easily read.

According to the electronic timepiece, the light emitting surface of the light emitting element may be divided into several areas which emit a plurality of colors in order to display numerical information or the like. Thus, various information can be displayed in different colors, making it possible to provide a variety of display forms which meet various demands.

According to the electronic timepiece, even when a common light emitting source that emits white color is used, a variety of colors can be produced by the light emitting element.

According to the electronic timepiece, a polarization separating film having a laminated structure of a plurality of thin films is used as the second polarization separating element. The polarization separating film with this structure can be made very thin and flexible, so that the electronic timepiece as a whole can be made thin, thereby facilitating the production process. When the second polarization separating element is formed so as to have a plurality of polarization separating portions of different wavelength characteristics, and thin films are laminated to form the portions, the polarization separating portions can be easily and reliably formed.

What is claimed is:

1. A display device in an electronic timepiece comprising:
    a first polarization separator that transmits linearly polarized light polarized in a first direction and that does not transmit therethrough linearly polarized light polarized in a direction perpendicular to said first direction;
    a polarization changing element disposed at a position to receive the linearly polarized light from said first polarization separator, that selects between a state in which a polarization direction of light transmitted therethrough is changed and a state in which the polarization direction is not changed; and
    a second polarization separator that transmits linearly polarized light polarized in a second direction and reflects linearly polarized light polarized in a direction perpendicular to said second direction, said second polarization separator disposed opposite said first polarization separator with said polarization changing element interposed therebetween, said second polarization separator including, within a plane, a plurality of polarization separating portions reflecting light of different wavelengths.

2. The display device in the electronic timepiece according to claim 1, further comprising a light scattering layer disposed opposite said first polarization separator with said polarization changing element interposed therebetween.

3. The display device in the electronic timepiece according to claim 1, further comprising a light emitting element that emits light to said polarization changing element through said second polarization separator.

4. The display device in the electronic timepiece according to claim 3, further comprising a translucent layer disposed between said second polarization separator and said light emitting element.

5. The display device in the electronic timepiece according to claim 3, wherein said light emitting element emits at least one of orange light, red light, and yellowish green light.

6. The display device in the electronic timepiece according to claim 4, wherein said light emitting element emits at least one of orange light, red light, and yellowish green light.

7. The display device in the electronic timepiece according to claim 3, wherein said light emitting element emits a plurality of colors from within a plane.

8. The display device in the electronic timepiece according to claim 4, wherein said light emitting element emits a plurality of colors from within a plane.

9. The display device in the electronic timepiece according to claim 3, wherein said light emitting element includes a color filter.

10. The display device in the electronic timepiece according to claim 4, wherein said light emitting element includes a color filter.

11. The display device in the electronic timepiece according to claim 1, each of said polarization separating portions of said second polarization separator having a multi-layered structure formed by alternately laminating two types of layers, with any two adjacent layers of the plurality of layers in a lamination direction having a same refractive index in a certain direction, but having a different refractive index in a direction perpendicular to the certain direction, each of said plurality of layers forming each of said polarization separating portions having different thicknesses, and said multi-layered structures of said polarization separating portions having different thickness combinations so that each of said polarization separating portions has different wavelength characteristics.

12. A display device in an electronic timepiece, comprising:
    a polarizer;
    a twisted nematic (TN) liquid crystal layer interposed between two substrates; and
    a polarization separating film, said polarizer, said twisted nematic liquid crystal layer, and said polarized light separating film being laminated in that order to form said electronic timepiece;
    wherein said polarization separating film transmits polarized light polarized in a first direction and reflects polarized light polarized in a direction perpendicular to the first direction, said polarization separating film including at least a first area and a second area,
    said liquid crystal layer including at an upper portion thereof a first display area in correspondence with the first area and a second display area in correspondence with the second area.

13. The display device in the electronic timepiece according to claim 12, further comprising a light scattering layer disposed opposite said polarizer with said liquid crystal layer interposed therebetween.

14. The display device in the electronic timepiece according to claim 12, further comprising a light emitting element that emits light to said polarization changing element through said polarization separating film.

15. The display device in the electronic timepiece according to claim 14, further comprising a translucent layer disposed between said polarization separating film and said light emitting element.

16. The display device in the electronic timepiece according to claim 14, wherein said light emitting element emits at least one of orange light, red light, and yellowish green light.

17. The display device in the electronic timepiece according to claim 14, wherein said light emitting element emits a plurality of colors from within a plane.

18. The display device in the electronic timepiece according to claim 14, wherein said light emitting element includes a color filter.

* * * * *